United States Patent [19]

Ogasawara

[11] Patent Number: 5,177,525
[45] Date of Patent: Jan. 5, 1993

[54] CONTROL METHOD FOR AN AUTO FOCUS APPARATUS
[75] Inventor: Akira Ogasawara, Kawasaki, Japan
[73] Assignee: Nikon Corporation, Tokyo, Japan
[21] Appl. No.: 760,127
[22] Filed: Sep. 16, 1991
[30] Foreign Application Priority Data
Sep. 26, 1990 [JP] Japan .................................. 2-254296
[51] Int. Cl.[5] ............................................ G03B 13/36
[52] U.S. Cl. .................... 354/402; 250/201.2
[58] Field of Search .............. 354/402, 406, 407, 408, 354/409; 250/201.2, 201.7, 201.8

[56] References Cited
U.S. PATENT DOCUMENTS

| 4,460,261 | 7/1984 | Eguchi et al. ........................ 354/408 |
| 4,791,445 | 12/1988 | Akada et al. ......................... 354/402 |
| 4,920,370 | 4/1990 | Taniguchi et al. .................... 354/402 |
| 4,956,659 | 9/1990 | Hamada et al. ................. 354/402 X |

FOREIGN PATENT DOCUMENTS 2-146010 6/1990 Japan .

Primary Examiner—W. B. Perkey
Attorney, Agent, or Firm—Shapiro and Shapiro

[57] ABSTRACT

According to the method of the present invention, in an overlap servo auto focus system wherein the accumulation by a charge accumulation type sensor for obtaining the defocus amount of a lens, the calculation of the defocus amount based thereon and the driving of the lens under servo control conforming to the calculated defocus amount are effected at a time in an overlapping manner, design is made such that in-focus judgment is not done when the amount of lens driving during the accumulation time of the charge accumulation type sensor is greater than a predetermined threshold value. In a modification, design is made such that in-focus judgment is not done when the amount of lens driving during the time from the start of the accumulation by the charge accumulation type sensor till the calculation of the defocus amount is greater than a predetermined threshold value. In another modification, design is made such that in-focus judgment is not done when the amount of lens driving during the time from a certain point of time in the course of the accumulation by the charge accumulation type sensor till the calculation of the defocus amount is greater than a predetermined threshold value.

15 Claims, 8 Drawing Sheets

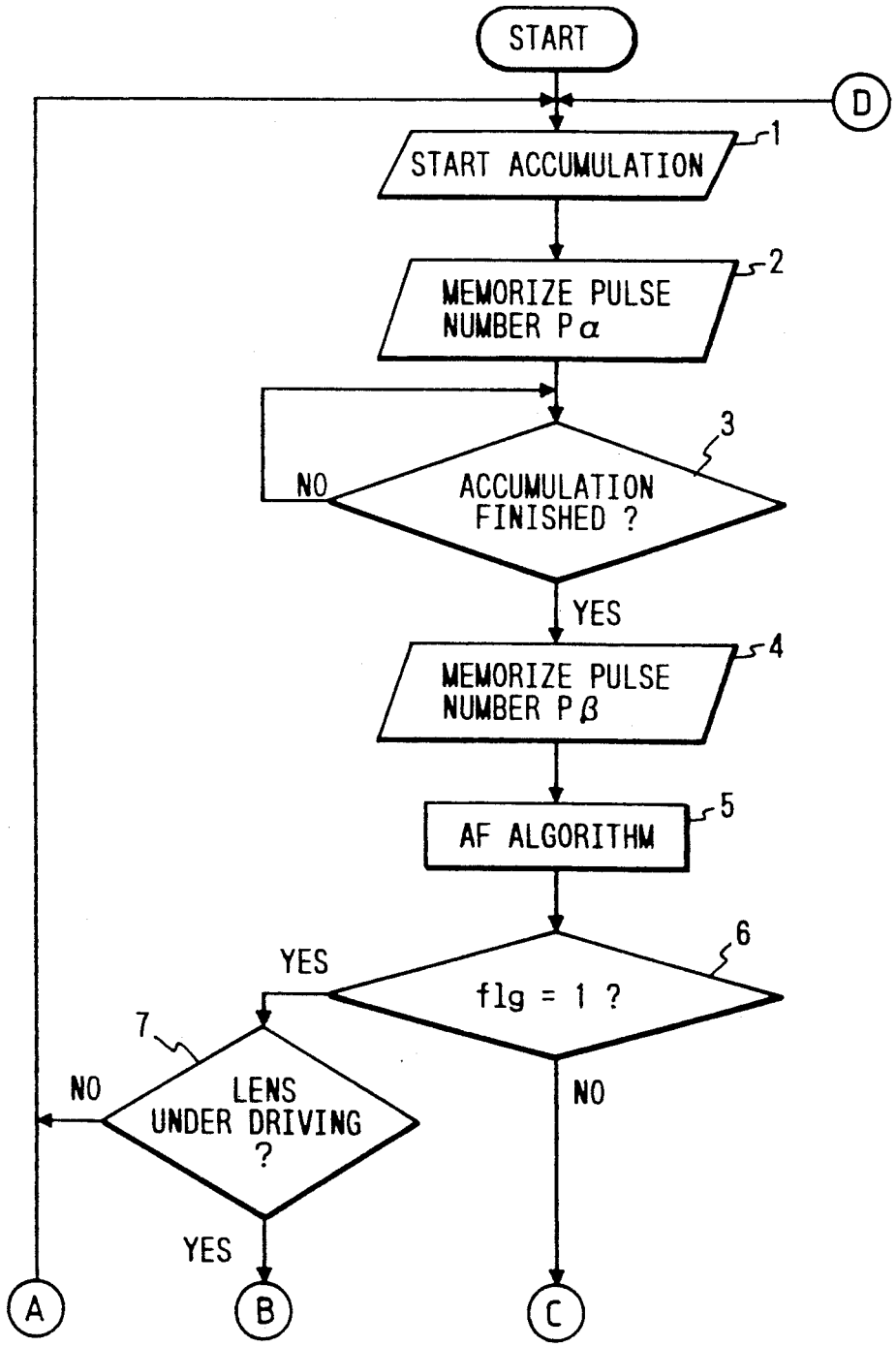

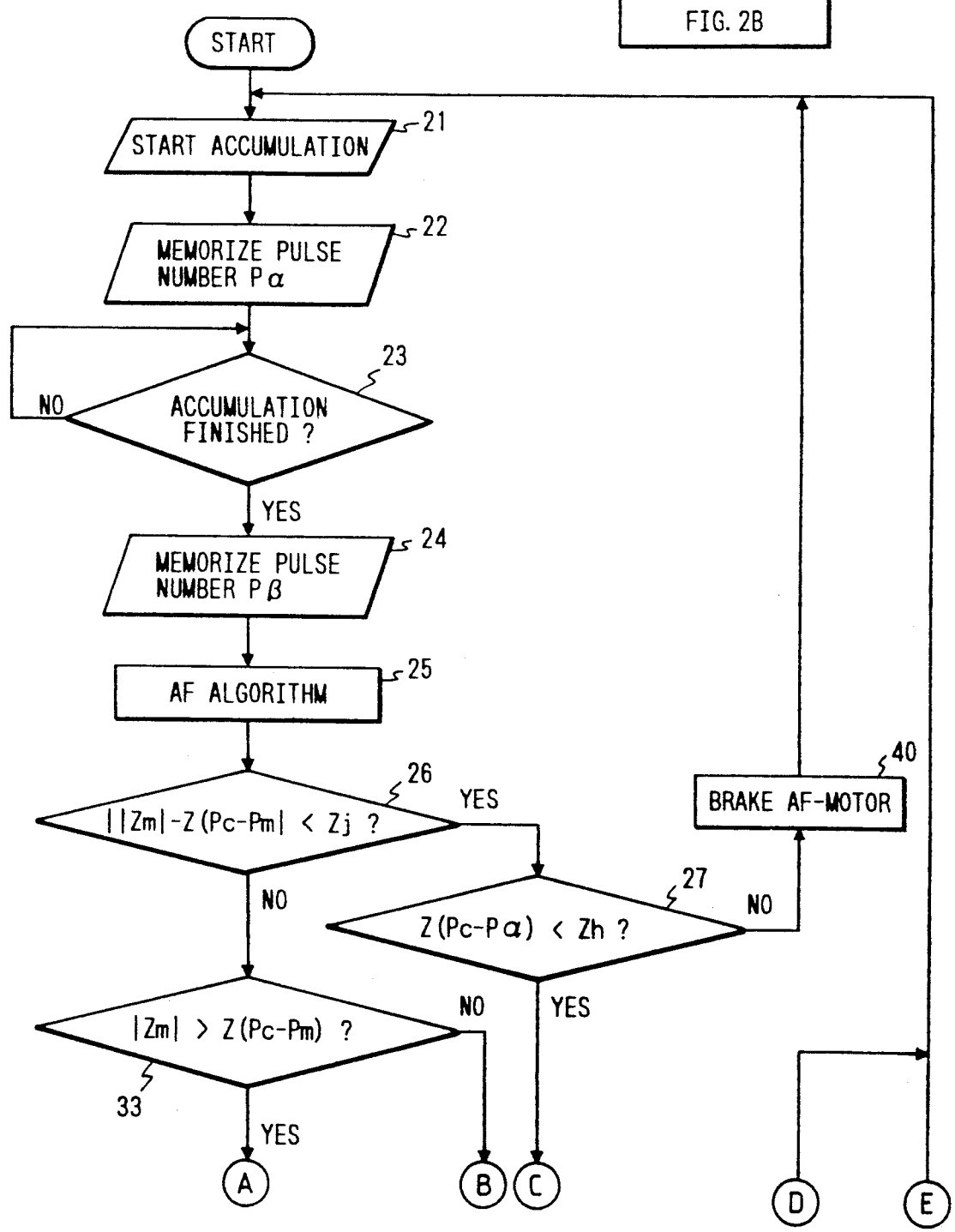

(a)

(b) IN-FOCUS SIGNAL (c) IN-FOCUS SIGNAL

CONTROL METHOD FOR AN AUTO FOCUS APPARATUS

BACKGROUND OF THE INVENTION

1. Field of the Invention

This invention relates to a control method for an auto focus apparatus, and particularly to an in-focus judging method in so-called overlap servo wherein the accumulating operation of a charge accumulation type sensor is performed even during the time when a photo-taking lens is being driven to an in-focus position, and in-focus control is effected while new in-focus positions are calculated one after another on the basis of the output of the sensor.

2. Related Background Art

FIG. 4 of the accompanying drawings shows a general block diagram of an auto focus apparatus in which a photo-taking lens is driven under servo control by a motor and thereby brought into an in-focus state. In FIG. 4, a light beam from an object transmitted through a photo-taking lens 41 responding to the auto focus apparatus is imaged on a light receiving sensor 42 which is in-focus state detecting means provided in a camera body, and an optical image signal from the light receiving sensor 42 is sent through an interface 43 to a controller 44 for controlling the entire system. Usually, a light receiving element of the charge accumulation type such as a CCD is used as the light receiving sensor 42 and a microprocessor is used as the controller 44. A microprocessor is also called a microcomputer, but for simplicity, the controller will hereinafter be referred to as CPU. The optical image pattern on the light receiving sensor 42 is A/D-converted by the interface 43 and output to the CPU 44, or is amplified into a suitable signal level by the interface 43 and directly A/D-converted by an A/D converter contained in the CPU 44.

The optical image pattern converted into a digital signal in this manner is data-processed by the CPU 44 in accordance with a predetermined algorithm to thereby calculate the amount of movement of the photo-taking lens 41 necessary to bring about the in-focus state. This will hereinafter be called the defocus amount. Herein, the optical principle and algorithm for the calculation of a specific defocus amount need not be described becausse there are already many known examples thereof.

The photo-taking lens 41 is provided with an encoder 46 to monitor the movement thereof, and each time the photo-taking lens 41 is moved by a predetermined amount along the optical axis thereof, the encoder 46 generates a pulse Pf. Hereinafter, this will sometimes be called the feedback pulse Pf. The CPU 44 indicates the calculated defocus amount (the amount of movement of the lens) to a motor driver 45 and drives a servo motor 47, thereby driving the photo-taking lens 41 in the in-focus direction. The movement of the photo-taking lens 41 is monitored by the CPU 44 with the aid of the feedback pulse Pf from the encoder 46, and when the pulses from the encoder 46 are counted by a pulse number corresponding to the defocus amount, the driving of the motor 47 for driving the photo-taking lens is stopped. Usually, the encoder 46 is constructed by a photointerrupter or the like being attached to a portion of the rotary shaft or the reduction gear of the motor so as to detect the rotation of the motor 47 for driving the photo-taking lens.

FIG. 5 of the accompanying drawings illustrates the defocus amount detected by the automatic focus adjusting apparatus. In FIG. 5, the defocus amount is defined as the distance between a position at which the light beam transmitted through the photo-taking lens 41 is imaged and the surface of film, i.e., the image plane deviation amount $\Delta Z$. That is, a case where the imaging plane of the photo-taking lens 41 is on the film surface fo refers to the in-focus state, a case where said imaging plane is on $f\alpha$ refers to the so-called front focus state, and a case where said imaging plane is on $f\beta$ refers to the so-called rear focus state. Also, as is apparent from FIG. 5, if the object is relatively far, the defocus amount $\Delta Z$ is substantially equal to the amount of movement of the lens necessary to achieve the in-focus. Accordingly, to cause an optical image to be formed (focused) on the film surface, the photo-taking lens 41 can be driven back and forth by the defocus amount $\Delta Z_\alpha$ when the lens is in the front focus or the defocus amount $\Delta Z_\beta$ when the lens is in the rear focus state.

In this sense, in the description of AF servo made with reference to FIG. 4, the amount of movement of the photo-taking lens 41 necessary to achieve the in-focus state thereof is also defined as the defocus amount. Exactly, the defocus amount $\Delta Z$ and the amount of lens driving do not coinside with each other, but in the description of the present invention, it is considered that they are equal to each other.

The purpose of auto focus is to bring a photo-taking optical system into the in-focus state and generally, to detect this, it is judged when the distance measurement output of an AF sensor is smaller than a certain threshold value that the photo-taking optical system is in focus. The inside of this threshold value is called "the in-focus zone", which is determined with the open F-value or the like of the photo-taking lens taken into account, thereby avoiding that unnecessarily strict accuracy is set to aggravate the convergence of servo. There is also a method whereby a second threshold value greater than another in-focus zone is provided discretely and when the calculated defocus amount is smaller than this second threshold value, after the termination of the lens driving under servo control based thereon, it is inferred that the lens is in the in-focus state before distance measurement is effected again. This servo method is called "open loop servo", and the second threshold value is called "the open loop zone". According to this, there is the advantage that an in-focus signal can be put out without awaiting the confirmation of the in-focus by the next distance measurement, and the disadvantage that the photographer is made to wait for some time until an in-focus signal is put out after the termination of the movement of the lens can be made inconspicuous. This method is greatly effective perticularly when the accumulation time is long. Putting out an in-focus signal specifically means effecting the display of the in-focus, or putting out a release permission signal in the case of the in-focus priority photographing mode.

FIG. 6 of the accompanying drawings is a graph showing the conventional servo control of auto focus, and the abscissa of this graph represents time and the ordinate of this graph represents defocus amount. In FIG. 6(a), the portion indicated by hatching is the sensor accumulation time. IN the conventional AF servo, distance measurement and lens driving are effected sequentially and therefore, during distance measurement, the lens is stationary as shown in FIG. 6(a). In this example, at first, distance measurement was effected in an accumulation time $t_1$ and defocus $Z_1$ was detected, and on the basis of the result of this, the lens was driven under servo control, but when distance measurement is again effected thereafter in an accumulation time $t_2$, defocus $Z_2$ is detected and further on the basis of this, the lens is driven under servo control, whereafter defocus $Z_3$ obtained by effecting distance measurement again in an accumulation time $t_3$ is judged to be smaller than the in-focus zone and lens driving is not effected. FIG. 6(b) shows the timing at which the in-focus signal when the judgment of the in-focus has been so done is output. Also, when in FIG. 6(a), the defocus amount $Z_2$ by the second distance measurement is smaller than the open loop zone, an in-focus signal is output at the timing of FIG. 6(c).

FIG. 7 of the accompanying drawings is a graph showing the operation of overlap servo. The photo-taking lens is driven in the in-focus direction with time, and the defocus amount decreases from one moment to the next and moves as indicated by the curve in FIG. 7(a). The period indicated by hatching from a time $t\beta$ to a time $t\beta$ is the accumulation time of the AF sensor which overlaps with lens driving. The fact that accumulation and lens driving overlap with each other means that although not shown, the servo control by the last distance measurement has continued hitherto. The count values of feedback pulses at the time $t\alpha$ and the time $t\beta$ are $P\alpha$ and $P\beta$, respectively. When accumulation is terminated at the time $t\beta$, although not described in detail, the average distance measuring position corresponding to a crude defocus amount Zm calculated from the then sensor output by the overlap servo control method previously proposed by the applicant (Japanese Laid-Open Patent Application No. 2-146010) is calculated as a value Pm converted in terms of the count value of the feedback pulses. As a matter of course, Pm is a value between the count value $P\alpha$ and the count value $P\beta$. The feedback pulses when the movement of the lens was monitored are shown in FIG. 7(b). The amount of movement of the image plane per one of these pulses is substantially the same for each lens and is integrated by a counter and indicates the amount of movement of the lens. The counter value does not indicate the absolute position of the lens, but indicates the relative position of the lens with the pulse count as a unit. After the accumulation by the sensor has been terminated, a processing time (called the algorithm time) is necessary to process the sensor output and calculate the defocus amount. In FIG. 7, the period indicated by the time from a time $t\beta$ till a time tc corresponds to the algorithm time. Even during the algorithm time, the lens driving by servo control based on the last defocus amount is continued and therefore, even if calculation is terminated at the time tc and the defocus amount Zm is obtained, it is necessary to subtract the defocus amount Z (Pc−Pm) corresponding to the difference (Pc−Pm) between the average distance measuring position Pm represented by the pulse count and the count value Pc at the time tc and make the result a servo control target amount. Here, the defocus amount Z(p) indicates a function for converting the pulse number p into a defocus amount Z, and hereinafter (Pc−Pm) or Z(Pc−Pm) will be called "the amount of correction". When the luminance of the distance measuring area is high and the accumulation time is short, the distance by which the lens is moved in the meantime is small and therefore, the pulse number (Pc−Pm) has been created almost during the algorithm time of AF, but in contrast, when the luminance is low and the accumulation time is long, the distance by which the lens is moved during the accumulation time is great and therefore, the difference between the average distance measuring position Pm represented by the pulse count and the count value $P\beta$ at an accumulation termination time $t\beta$ becomes great. The algorithm time depends on hardware which carries out the calculation process, and usually a micro-computer is used for this purpose and the processing time is changed by the object image, but the change is much less than the range of change of the accumulation time.

However, the application of the conventional in-focus judgment method to the overlap servo previously proposed by the applicant and schematically described above would encounter problems as will hereinafter be discussed.

In the structure of the overlap servo as previously described, it is at the time tc that the result of the calculation of the defocus is put out, and what is the subject of the in-focus judgment when effected is not the crude defocus amount Zm calculated by processing the sensor output, but the crude defocus amount minus the amount of correction Z(Pc−Pm). However, even if Zm−Z(Pc−Pm) indicates the inside of the in-focus zone, there may be a case where the crude defocus amount Zm by the sensor output is considerably greater than the in-focus zone, but nevertheless the amount of correction Z(Pc−Pm) happens to be approximate to Zm and therefore the corrected defocus amount Zm−Z(Pc−Pm) is within the in-focus zone and this is judged to be the in-focus. In such case, the distance measurement error included in the crude defocus amount is not negligibly small and therefore, actually it is often the case that the crude defocus amount is not within the in-focus zone, and misjudgment is apt to occur. Further, if the accumulation time is long and the amount by which the lens is moved in the meantime is great relative to the defocus amount, the optical image of the object on the sensor will change from one moment to another in conformity therewith, and the sensor output read out at the accumulation termination time $t\beta$ will become low in contrast and the defocus amount Zm obtained by this signal being data-processed will be of bad accuracy. Generally, it is unavoidable that the more the lens is moved during the accumulation, the more the accuracy of distance measurement is reduced, but unless this is considered to be one of judgment elements for the in-focus judgment, it will often be the case that in spite of the lens actually being not in focus, the lens is judged to be in focus.

In order to avoid these problems, there would occur to mind a method whereby the judgment of the in-focus is made when the crude defocus amount Zm itself is within the in-focus zone and moreover the defocus amount Zm−Z(Pc−Pm) corrected by subtracting the amount of correction Z(Pc−Pm) is also within the in-focus zone. In terms of accuracy, this method could be sufficiently reliable, but satisfying this judgment condition means that the lens is hardly being moved during accumulation and during the algorithm time after that, and actually, it is a case where lens driving is terminated and the result obtained by effecting distance measurement again thereafter is within the in-focus zone (FIG. 8 of the accompanying drawings) or a case where accumulation is started near the servo target and the accumulation is terminated after the termination of driving (FIG. 9 of the accompanying drawings). In such a case, if the accumulation time is long, it is after a considerable time has passed after the termination of the driving of the lens that the in-focus judgment can be made, and this has led to the disadvantage that responsiveness is reduced.

SUMMARY OF THE INVENTION

It is the object of the present invention to solve the above-noted problems peculiar to the prior art and to provide a control method for an auto focus apparatus which is high in the reliability of in-focus judgment and good in responsiveness.

A control method for an auto focus apparatus according to the present invention comprises the steps of:

processing the output data of a charge accumulation type sensor and calculating a defocus amount indicative of the amount and direction of the deviation from the actual focus position to an in-focus position by calculation means;

driving a photo-taking lens to the in-focus position by driving means under servo control in accordance with said defocus amount;

successively detecting the actual amount of movement of said photo-taking lens by lens movement amount detecting means;

effecting the accumulation by said charge accumulation type sensor in an overlapping manner even while said driving means drives said photo-taking lens toward the in-focus position, and correcting a crude defocus amount said calculation means has calculated from the output of said charge accumulation type sensor by the amount of movement of the lens detected by said lens movement amount detecting means after the accumulation by said charge accumulation type sensor, thereby obtaining a corrected defocus amount;

using said corrected defocus amount for the control of the next driving of the photo-taking lens, and controlling the accumulation by said charge accumulation type sensor and the driving under servo control so as to be effected successively in an overlapping manner; and judging whether said photo-taking lens is in the in-focus state;

wherein said judgment is not done when the amount of lens driving during the accumulation time of said charge accumulation type sensor is greater than a predetermined threshold value.

According to a modification of the above-described method, when in the in-focus judgment of the last step, the amount of lens driving during the time from the start of the accumulation by said charge accumulation type sensor till the calculation of the defocus amount is greater than a predetermined threshold value, said judgment is not done.

According to another modification, when in the in-focus judgment of the last step, the amount of lens driving during the time from a certain point of time in the course of the accumulation by said charge accumulation type sensor till the calculation of the defocus amount is greater than a predetermined threshold value, said judgment is not done.

By the method of the present invention described above, the reduction in the reliability of the in-focus judgment when the amount of movement of the lens during the accumulation by the sensor is great is overcome and the in-focus judgment in overlap servo is ensured in its accuracy while responsiveness is enhanced to the utmost.

DESCRIPTION OF THE PREFERRED EMBODIMENTS

Figure 1B:
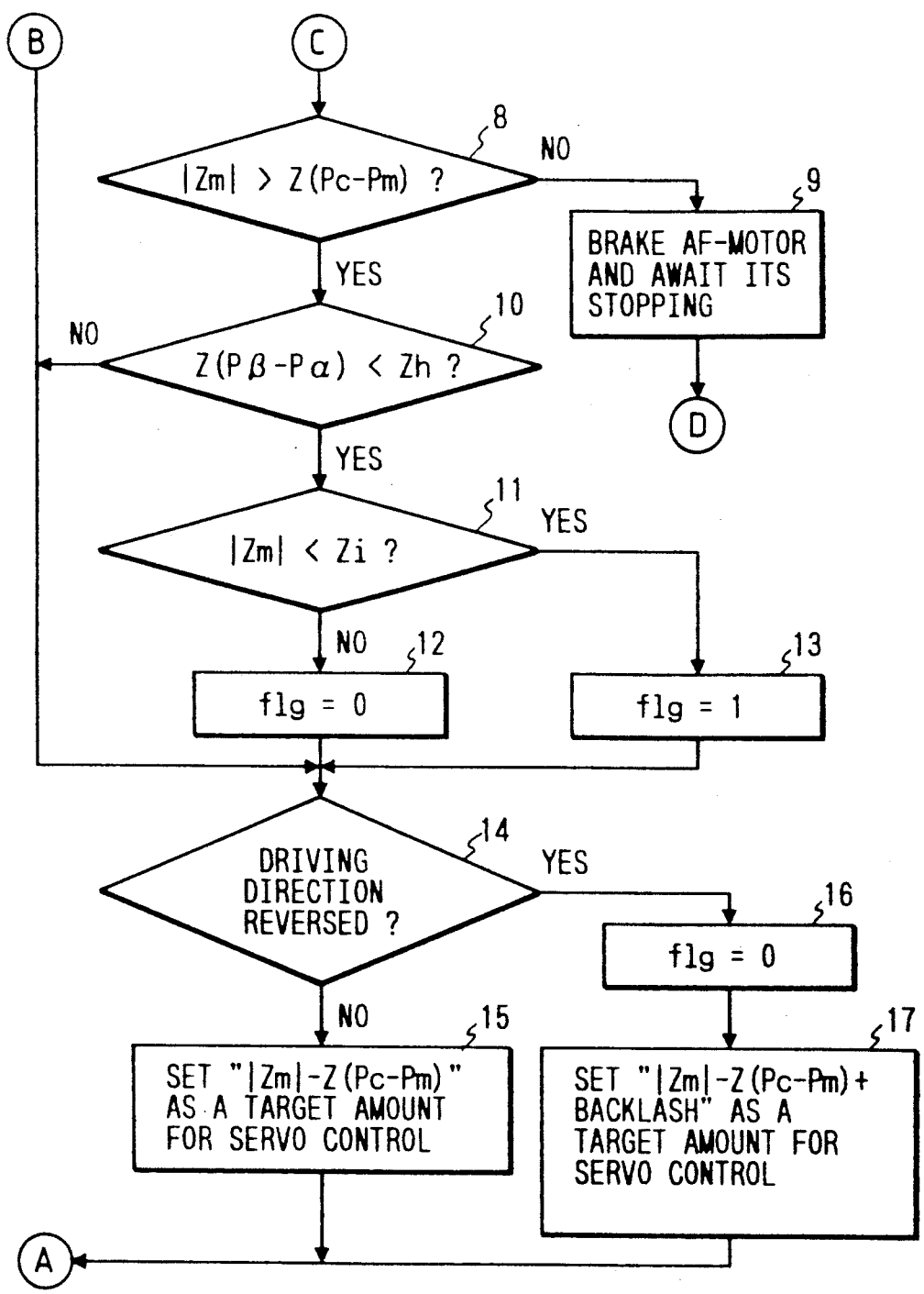
FIG. 1 comprised of FIGS. 1A and 1B is a flow chart of an embodiment of a control method for an auto focus apparatus according to the present invention.

Some embodiments of the present invention will hereinafter be described in detail with reference to the drawings.

The present invention first considers that the amount of lens movement $Z(P\beta - P\alpha)$ during sensor accumulation is a new test item for in-focus judgment. It is to be understood that when this value is greater than a certain threshold value $Zh$, in-focus judgment is not done.

$$Z(P\beta - P\alpha) < Zh \qquad (1)$$

With the concept of the open loop zone applied to the invention, it is also to be understood that when the crude defocus amount $Zm$ is greater than another certain threshold value $Zi$, in-focus judgment is not done.

$$Zm < Zi \qquad (2)$$

New amount of lens driving =

$$Zm - Z(Pc - Pm) \qquad (3)$$

That is, expression (1) is a necessary condition for applying the open loop servo, and whether the open loop servo is possible is judged by means of expression (2). When the open loop servo is possible, the driving of the lens under servo control is started with the next amount of lens driving as $Zm - Z(Pc - Pm)$ of expression (3) (or the driving till then is taken over) and at the same time, an in-focus signal is output. Here, the threshold value $Zi$ is basically the same as the conventional open loop servo zone.

FIG. 1 is a flow chart of the overlap servo and in-focus judgment according to an embodiment of the control method for an auto focus apparatus. In FIG. 1, at a step 1, the charge accumulation by a sensor is started and simultaneously therewith, at a step 2, the count value $P\alpha$ of the then feedback pulse is memorized. At a step 3, the lapse of the charge accumulation time of the sensor conforming to the luminance of an object is waited for. When the accumulation time expires, at a step 4, as at the step 2, the count value $P\beta$ of the then feedback pulse is memorized. Subsequently, at a step 5, the defocus amount Zm and a distance measuring position Pm corresponding thereto are calculated on the basis of suitable algorithm.

A step 6 onward is a flow chart relating to in-focus judgment. At the step 6, whether the open loop servo is going on is first examined. The initial value of flg is 0 and the value of flg when the open loop servo is going on is 1. If FLG=1, the open loop servo has already been entered and therefore, advance is made to a step 7, where whether the lens is under driving is tested. If the lens is not under driving, that is, if the open loop servo is completed, return is made to the step 1, where second distance measurement is repeated. If the lens is under driving, the program leads to the refreshing of the servo control by the new distance measurement data Zm of steps 14 and so on. Once the open loop zone has been entered, the refreshing of the servo control by the second distance measurement is not effected until the driving under the servo control is completed, and there is also a method whereby the second distance measurement is only repeated if at a step 6, FLG=1. If at the step 6, FLG=0, whether the amount of correction $Z(Pc-Pm)$ exceeds the crude defocus amount Zm is tested at a step 8. If the former exceeds the latter, it means that the lens has passed the in-focus position and therefore, at a step 9, sudden brake is applied. If not so, the test of expression (1) is effected at a step 10. If as a result, the amount of lens driving $Z(P\beta-Pa)$ during the sensor accumulation is greater than a predetermined value, in-focus judgment is not done, that is, the lens is not judged to be in focus, but the refreshing of the servo control by the new distance measurement data Zm of steps 14 and so on is effected. If the amount of lens driving $Z(P\beta-Pa)$ is smaller than the predetermined value, the test of expression (2) is effected at a step 11. The step 11 is the comparison of the crude defocus amount Zm with the open loop servo area Zi, and if Zm is smaller than Zi, at a step 13, FLG is made into FLG=1 to memorize that the open loop zone has been entered. If the open loop servo area Zi is smaller than Zm, FLG=0 at a step 12. Thereafter, at a step 14, whether the last direction of lens driving is the same as the current direction of lens driving is examined. This is because by the object moving during lens driving, the direction of lens driving may sometimes be reversed as detected at the step 8, and if the direction of lens driving is not reversed, at a step 15, $|Zm|-Z(Pc-Pm)$ is set to the same direction, and if the direction of lens driving is reversed and if at a step 16, FLG=0, at a step 17, an amount of mechanical back-lash is applied thereto to thereby drive the lens in the direction opposite to the last direction under servo control.

Although not described hitherto, the defocus amount Zm has the polarities of front focus and rear focus as a matter of course, and with this taken into account, at the steps 8, 11, 15 and 17, Zm is made into an absolute value.

According to such a method, by the condition judgment by means of expressions (1) and (2), the amount of movement of the lens during the sensor accumulation is compared with a threshold value Zh, and then the crude defocus amount Zm is compared with the threshold value Zi of the open loop zone, whereby the in-focus judgment under overlap servo becomes possible.

Description will now be made of a somewhat simpler method, i.e., a method whereby if the amount of driving $Z(Pc-Pa)$ of the lens from the start of the sensor accumulation till the termination of algorithm calculation is less than a certain threshold value Zh and the defocus amount after corrected is smaller than the in-focus zone width, the lens is judged to be in focus.

$$Z(Pc-Pa)<Zh \quad (4)$$

The amount of driving of the lens after the sensor accumulation being small means that even if the accumulation time is long, the servo control has already entered the deceleration servo area and that the accumulation by the sensor has been effected with the lens little moved. Further, that the defocus amount after corrected at a time tc is calculated as being smaller than the in-focus zone width often means that usually the servo control has entered the final stage of the deceleration servo area at the end of the servo control. The deceleration servo area is an area in which so that the lens may be stopped accurately at the target position (the in-focus position) when the servo target has been approached, the driving speed is gradually dropped from this side of the target position. Thus, the judgment condition of expression (4) is that the regulation for the amount of movement of the lens and the amount of correction $Z(Pc-Pm)$ during accumulation is simply effected by one judgment expression, and in practice, even such an in-focus judgment method is sufficiently effective.

Also, in expression (4), $Z(Pc-Pm)$ can be adopted in place of $Z(Pc-Pa)$ to thereby endow the expression with a substantially similar meaning and therefore, use may be made of $$Z(Pc-Pm)<Zh. \quad (5)$$

$Z(Pc-Pm)$ is anyhow calculated when the correction of the defocus amount Zm is effected and therefore, it is convenient for calculation.

Figure 2B:
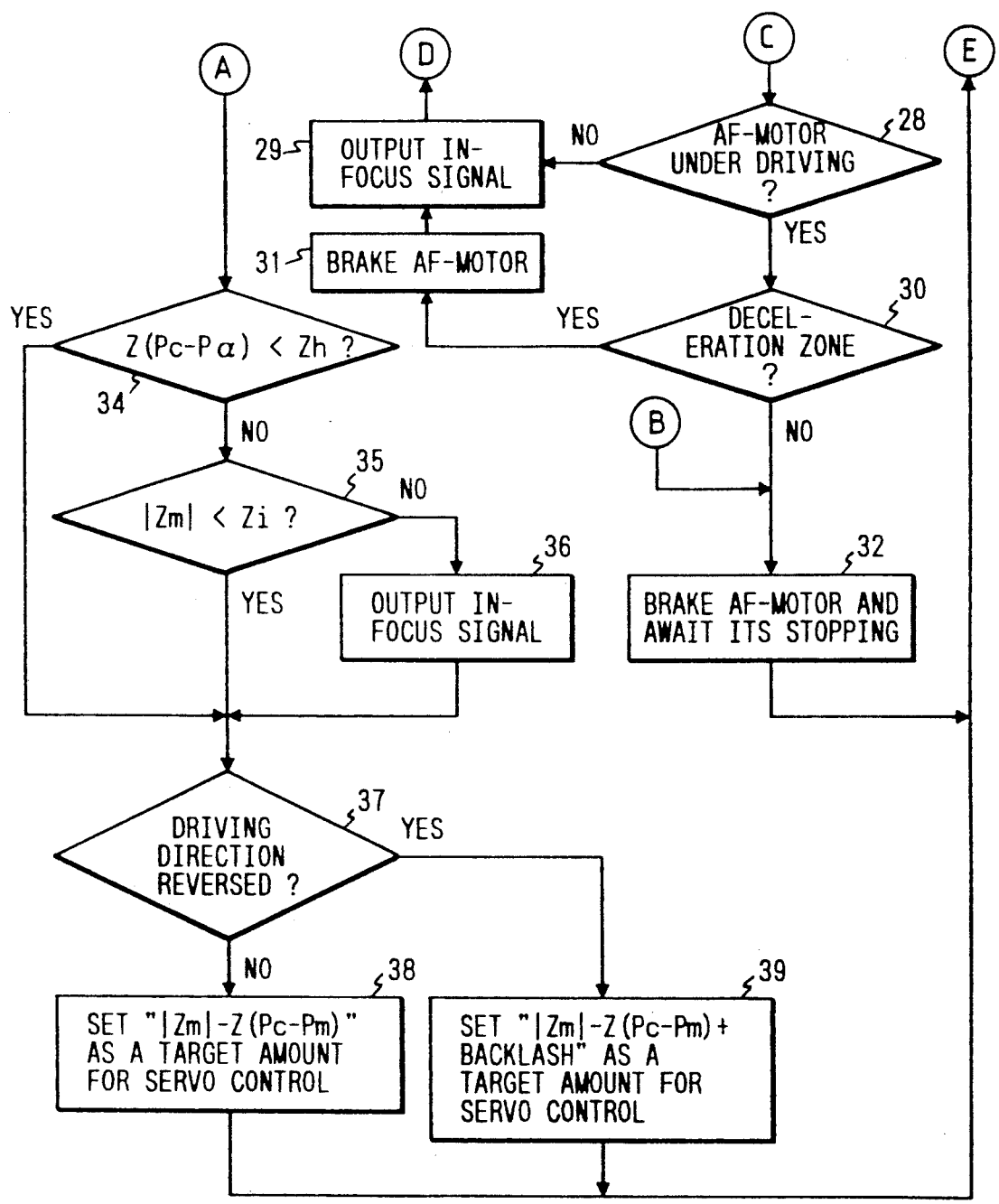
FIG. 2 comprised of FIGS. 2A and 2B is a flow chart of another embodiment of the control method for an auto focus apparatus according to the present invention.

This will now be described with reference to the flow chart of FIG. 2. In FIG. 2, steps 21 to 25 are entirely the same as the steps 1 to 5 of FIG. 1 and therefore need not be described. When at the step 25, algorithm is passed, first at a step 26, whether the defocus amount after corrected has entered the in-focus zone Zi is tested. If it is within the in-focus zone, advance is made to a step 27, where the judgment of reliability by expression (4) is done. If it is judged that there is no reliability, advance is made to a step 40, where brake is applied to the AF-motor to stop this motor, but an in-focus signal is not output. That is, the lens is not regarded as being in focus. If it is judged there is reliability, advance is made to a step 28, where whether the motor is under driving at that time is tested. If the motor is not under driving, the motor need not be driven any more and therefore, an in-focus signal is output at a step 29. In this case, it is also possible that an in-focus signal has already been output during the last distance measurement, but there is no particular inconvenience even if the in-focus signal is again output and therefore, it has been dealt with in-discriminately. If the motor is under driving, the lens can be controlled within the in-focus zone if the lens driving can then be immediately stopped and therefore, whether sudden braking is possible is tested at a step 30. As previously described, the driving speed is gradually decelerated at the final stage of the driving under servo control and therefore, if the deceleration servo area has been entered, braking is judged to be possible and advance is made to a step 31, where sudden brake is applied, whereafter the in-focus is assumed and at the step 29, an in-focus signal is output and return is made to the second distance measurement. Exactly, even if the lens is in the deceleration zone or even if the lens is in the last particularly low portion of the lens speed of the deceleration zone, whether the lens can be stopped by the braking of the step 31 without overrunning can be known only after the lens has been actually stopped. So, a method is also possible in which after brake has been applied at the step 31, an in-focus signal is not output, but after the lens has been stopped, the count number of the feedback pulse after the braking is examined and if the lens still stays within the in-focus zone, an in-focus signal is output. If it is found at the step 30 that the lens is not within the deceleration zone, sudden brake is applied at a step 32. However, it is clear that the lens overruns beyond the in-focus zone, and the next servo control is for the lens driving in the opposite direction and therefore, return is made to the second distance measurement after the lens is braked. Even when at the step 26, it is judged that the lens is not within the in-focus zone, whether the amount of correction Z(Pc−Pm) is not greater than the crude defocus amount is examined at a step 33, and if the former is greater than the latter, the servo target (the in-focus point) is overrun and moreover the motor is still rotating with full power and therefore, as previously described, sudden brake is applied at the step 32 and the stoppage of the lens is awaited. If the lens is still short of the in-focus point, at a step 34, the judgment of reliability is done by means of expression (4), and if it is judged that there is reliability, whether the lens is within the open loop zone is tested at a step 35. At the step 27, expression (4) is used to check up the reliability for testing the in-focus zone, and at the step 34, expression (4) is used to check up the reliability for testing the open loop zone. If at the step 35, the crude defocus amount Zm is smaller than the open loop zone Zi, open loop servo is effected and at a step 36, an in-focus signal is output.

The steps 37, 38 and 39 of FIG. 2 are similar to the steps 14, 15 and 16 of FIG. 16 and need not be described.

The in-focus judgment done at the step 26 of FIG. 2 and the subsequent flow (steps 27, 28, 29, 30, 31, 32 and 40) may be inserted after the step 5 (AF algorithm) of FIG. 1.

Figure 3:
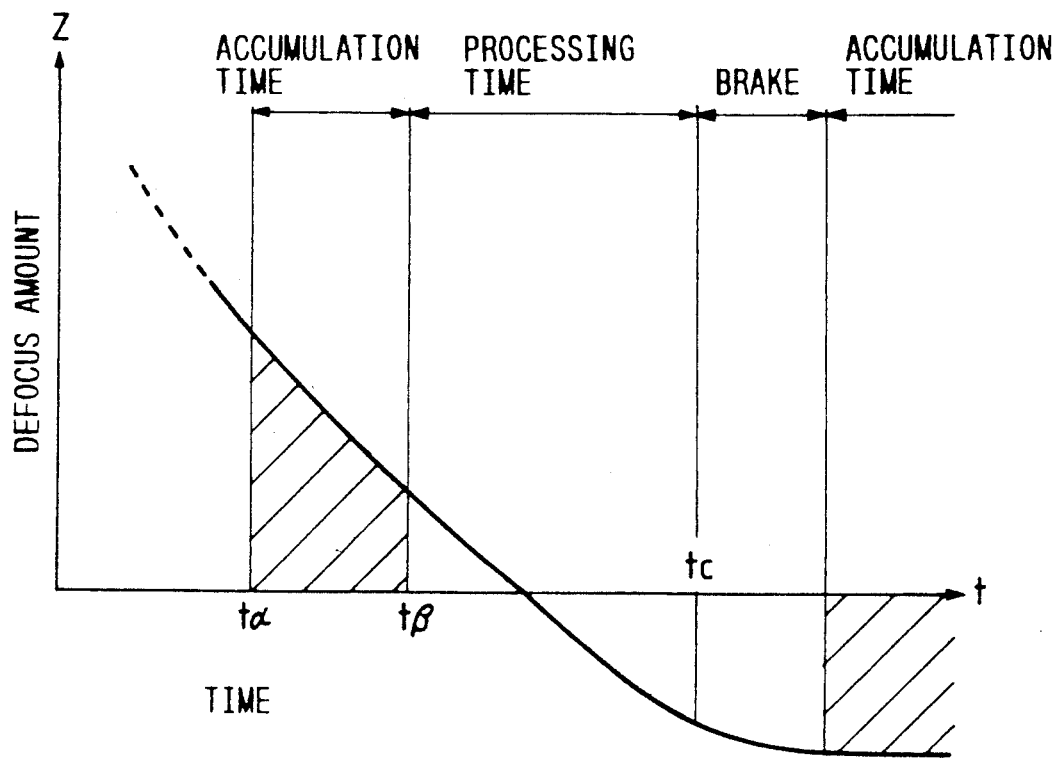
FIG. 3 is a graph showing an example of the timing when the in-focus position is overrun during overlap servo.
Figure 4:
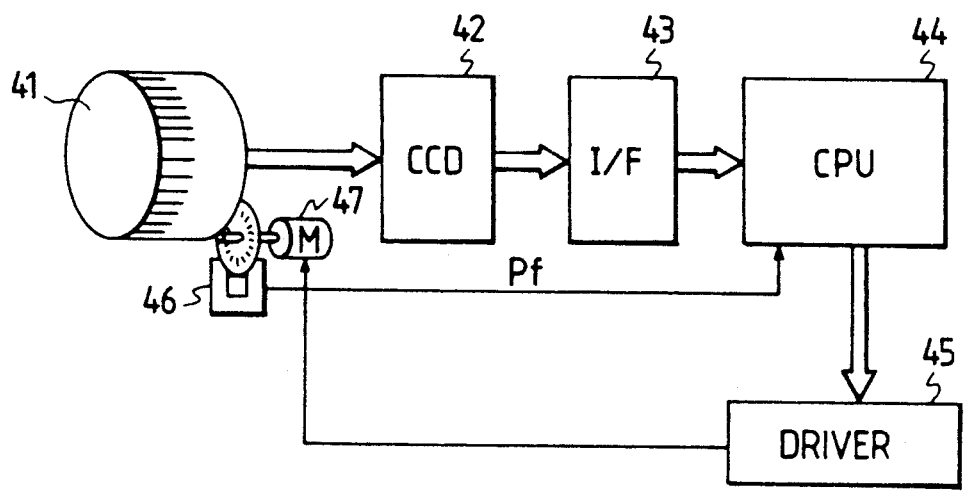
FIG. 4 is a block diagram illustrating the construction of a popular automatic focus adjusting apparatus.
Figure 5:
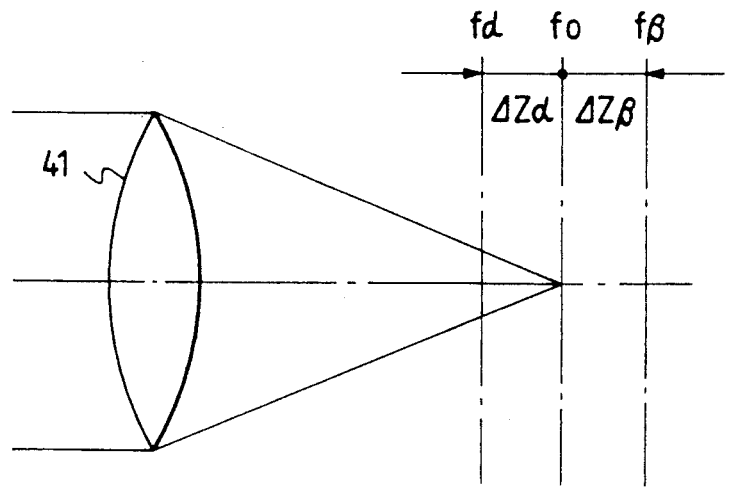
FIG. 5 illustrates the defocus amount.
Figure 6:
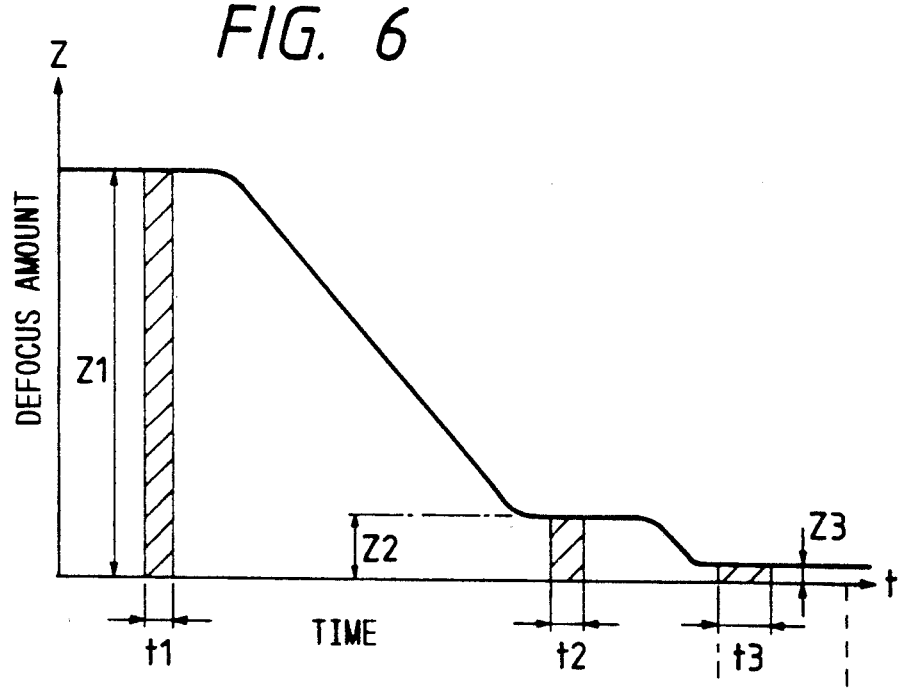
FIGS. 6(a) to (c) are a graph showing the output timings of a conventional servo pattern and an in-focus signal.
Figure 6:
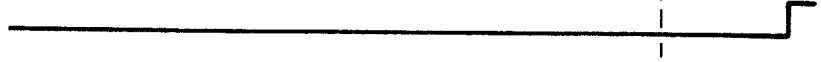
Figure 6:
Figure 7:
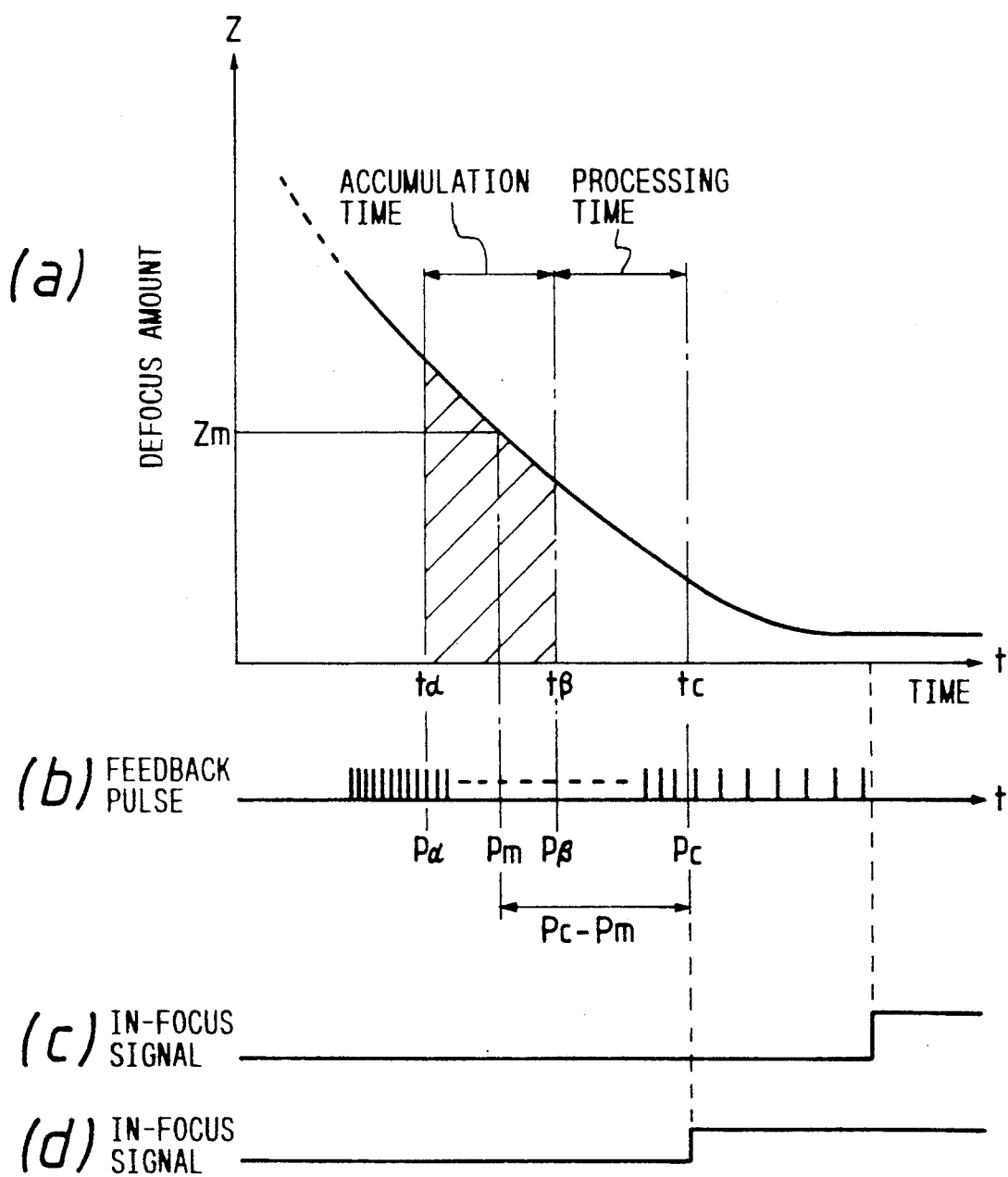
FIGS. 7(a) to (d) are a graph showing the output timings of the typical servo pattern of overlap servo and an in-focus signal.
Figure 8:
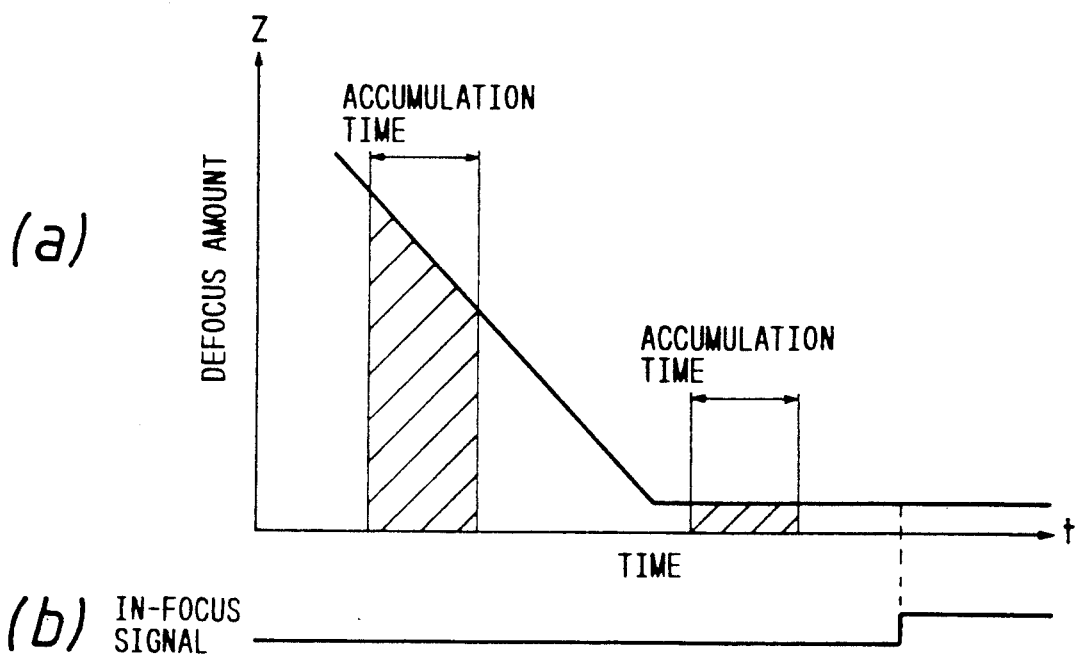
FIGS. 8(a), 8(b), 9(a), and 9(b) are graphs showing examples of the in-focus signal and output timing during overlap servo.
Figure 9:
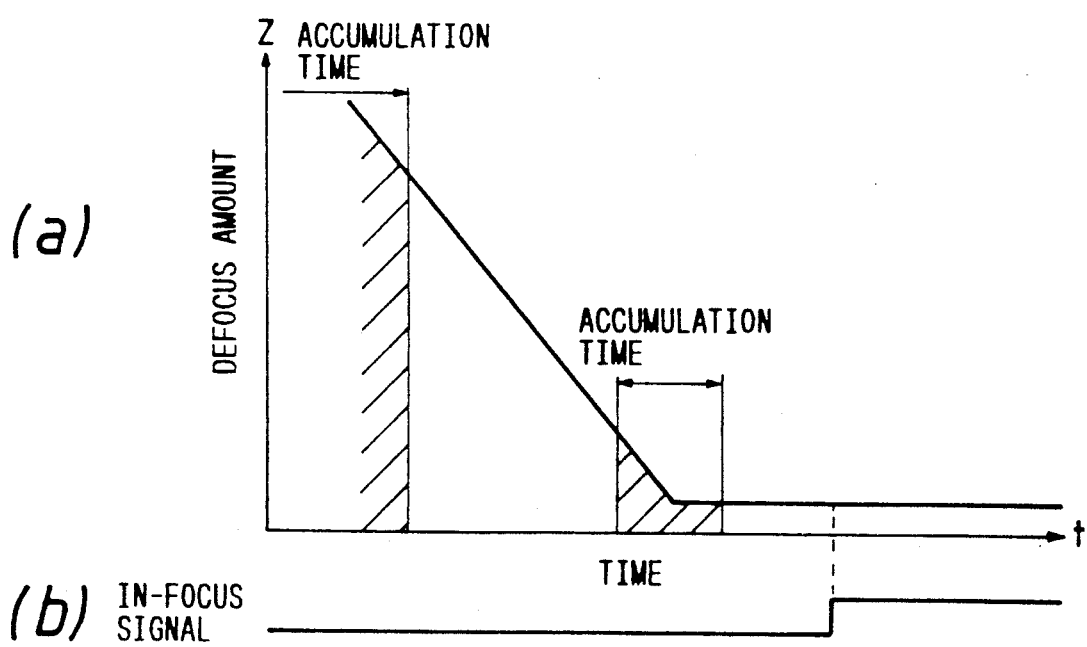

The manner in which when at the step 9 and the step 32, it is found that the lens has completely overrun, brake is applied to the motor, whereafter the stoppage of the motor is awaited and thereafter the second distance measurement is started is shown in FIG. 3. The reason why the lens is once stopped after overrunning, whereafter distance measurement is effected is that if the direction of lens driving is changed over at a stroke, the response of the mechanical system will retard and therefore it cannot be known from when the detected feedback pulse should be reversely counted and under the influence of back-lash also, the correction of overlap servo cannot be accomplished accurately. In the case of a detection system which can detect the movement of the lens without being much affected by back-lash even during the reversal of driving and a count system such as a two-phase counter which can automatically pursue the direction and amount of rotation, it is possible in principle to effect the second distance measurement at once, but this will require very much complicated corrective calculation and therefore, has been avoided in the present embodiment.

What is claimed is:

1. A control method for an auto focus apparatus whereby the output data of a charge accumulation type sensor is processed and a defocus amount indicative of the amount and direction of the deviation from the actual focus position to an in-focus position is calculated by calculation means, and a photo-taking lens is driven to the in-focus position by driving means under servo control in accordance with said defocus amount, comprising the steps of:

successively detecting the actual amount of movement of said photo-taking lens by lens movement amount detecting means;

effecting the accumulation by said charge accumulation type sensor in an overlapping manner even while said driving means drives said photo-taking lens toward the in-focus position, and correcting a crude defocus amount said calculation means has calculated from the output of said charge accumulation type sensor by the amount of movement of the lens detected by said lens movement amount detecting means after the accumulation by said charge accumulation type sensor, thereby obtaining a corrected defocus amount;

using said corrected defocus amount for the control of the next driving of the photo-taking lens, and controlling the accumulation by said charge accumulation type sensor and the driving under servo control so as to be effected successively in an overlapping manner; and judging whether said photo-taking lens is in the in-focus state;

wherein said judgment is not done when the amount of lens driving during the accumulation time of said charge accumulation type sensor is greater than a predetermined threshold value.

2. A control method for an auto focus apparatus whereby the output data of a charge accumulation type sensor is processed and a defocus amount indicative of the amount and direction of the deviation from the actual focus position to an in-focus position is calculated by calculation means, and a photo-taking lens is driven to the in-focus position by driving means under servo control in accordance with said defocus amount, comprising the steps of:

successively detecting the actual amount of movement of said photo-taking lens by lens movement amount detecting means;

effecting the accumulation by said charge accumulation type sensor in an overlapping manner even while said driving means drives said photo-taking lens toward the in-focus position, and correcting a crude defocus amount said calculation means has calculated from the output of said charge accumulation type sensor by the amount of movement of the lens detected by said lens movement amount detecting means after the accumulation by said charge accumulation type sensor, thereby obtaining a corrected defocus amount;

using said corrected defocus amount for the control of the next driving of the photo-taking lens, and controlling the accumulation by said charge accumulation type sensor and the driving under servo control so as to be effected successively in an overlapping manner; and judging whether said photo-taking lens is in the in-focus state;

wherein said judgment is not done when the amount of lens driving during the time from the start of the accumulation by said charge accumulation type sensor till the calculation of the defocus amount is greater than a predetermined threshold value.

3. A control method for an auto focus apparatus whereby the output data of a charge accumulation type sensor is processed and a defocus amount indicative of the amount and direction of the deviation from the actual focus position to an in-focus position is calculated by calculation means, and a photo-taking lens is driven to the in-focus position by driving means under servo control in accordance with said defocus amount, comprising the steps of:

successively detecting the actual amount of movement of said photo-taking lens by lens movement amount detecting means;

effecting the accumulation by said charge accumulation type sensor in an overlapping manner even while said driving means drives said photo-taking lens toward the in-focus position, and correcting a crude defocus amount said calculation means has calculated from the output of said charge accumulation type sensor by the amount of movement of the lens detected by said lens movement amount detecting means after the accumulation by said charge accumulation type sensor, thereby obtaining a corrected defocus amount;

using said corrected defocus amount for the control of the next driving of the photo-taking lens, and controlling the accumulation by said charge accumulation type sensor and the driving under servo control so as to be effected successively in an overlapping manner; and judging whether said photo-taking lens is in the in-focus state;

wherein said judgment is not done when the amount of lens driving during the time from a certain point of time in the course of the accumulation by said charge accumulation type sensor till the calculation of the defocus amount is greater than a predetermined threshold value.

4. A method according to claim 1, wherein said in-focus judgment is done by comparing the crude defocus amount with a discretely determined threshold value, and when said crude defocus amount is smaller than said threshold value, servo control is effected on the basis thereof and the lens is immediately judged to be in focus.

5. A method according to claim 2, wherein said in-focus judgment is done by comparing the crude defocus amount with a discretely determined threshold value, and when said crude defocus amount is smaller than said threshold value, servo control is effected on the basis thereof and the lens is immediately judged to be in focus.

6. A method according to claim 3, wherein said in-focus judgment is done by comparing the crude defocus amount with a discretely determined threshold value, and when said crude defocus amount is smaller than said threshold value, servo control is effected on the basis thereof and the lens is immediately judged to be in focus.

7. A method according to claim 1, wherein when said corrected defocus amount has become different in sign from said crude defocus amount before corrected, brake is immediately applied to the lens and the next accumulation is not started until the lens is stopped.

8. A method according to claim 2, wherein when said corrected defocus amount has become different in sign from said crude defocus amount before corrected, brake is immediately applied to the lens and the next accumulation is not started until the lens is stopped.

9. A method according to claim 3, wherein when said corrected defocus amount has become different in sign from said crude defocus amount before corrected, brake is immediately applied to the lens and the next accumulation is not started until the lens is stopped.

10. A method according to claim 1, wherein if said corrected defocus amount is within a predetermined in-focus area and at that time, the lens is being driven but the speed thereof is within a speed range which can be braked by a brake, brake is immediately applied to the lens and the lens is judged to be in focus.

11. A method according to claim 2, wherein if said corrected defocus amount is within a predetermined in-focus area and at that time, the lens is being driven but the speed thereof is within a speed range which can be braked by a brake, brake is immediately applied to the lens and the lens is judged to be in focus.

12. A method according to claim 3, wherein if said corrected defocus amount is within a predetermined in-focus area and at that time, the lens is being driven but the speed thereof is within a speed range which can be braked by a brake, brake is immediately applied to the lens and the lens is judged to be in focus.

13. A method according to claim 1, wherein when said corrected defocus amount is within or in the vicinity of a predetermined in-focus area and at that time, the lens is being driven, brake is applied to the lens and the stoppage of the lens is awaited, and when the actual stopped position detected by said lens movement amount detecting means is within the in-focus area, the lens is judged to be in focus.

14. A method according to claim 2, wherein when said corrected defocus amount is within or in the vicinity of a predetermined in-focus area and at that time, the lens is being driven, brake is applied to the lens and the stoppage of the lens is awaited, and when the actual stopped position detected by said lens movement amount detecting means is within the in-focus area, the lens is judged to be in focus.

15. A method according to claim 3, wherein when said corrected defocus amount is within or in the vicinity of a predetermined in-focus area and at that time, the lens is being driven, brake is applied to the lens and the stoppage of the lens is awaited, and when the actual stopped position detected by said lens movement amount detecting means is within the in-focus area, the lens is judged to be in focus.

* * * * *